(12) United States Patent
Lehtinen et al.

(10) Patent No.: US 9,085,020 B2
(45) Date of Patent: Jul. 21, 2015

(54) METHOD AND APPARATUS FOR HOMOGENIZING AND STABILIZING AN IRON-BEARING RESIDUE

(75) Inventors: Leena Lehtinen, Pori (FI); Marko Lahtinen, Espoo (FI); Bror Nyman, Vanha-Ulvila (FI); Timo Haakana, Pori (FI); Jari Tiihonen, Pori (FI)

(73) Assignee: OUTOTEC OYJ, Espoo (FI)

( * ) Notice: Subject to any disclaimer, the term of this patent is extended or adjusted under 35 U.S.C. 154(b) by 42 days.

(21) Appl. No.: 13/698,467

(22) PCT Filed: May 31, 2011

(86) PCT No.: PCT/FI2011/050508
§ 371 (c)(1),
(2), (4) Date: Nov. 16, 2012

(87) PCT Pub. No.: WO2011/151521
PCT Pub. Date: Dec. 8, 2011

(65) Prior Publication Data
US 2013/0060075 A1    Mar. 7, 2013

(30) Foreign Application Priority Data

Jun. 4, 2010   (FI) ...................................... 20100237

(51) Int. Cl.
*B09B 3/00*   (2006.01)
*B01F 7/00*   (2006.01)
(Continued)

(52) U.S. Cl.
CPC ............... *B09B 3/00* (2013.01); *B01F 7/00216* (2013.01); *B01F 7/00441* (2013.01); *B01F 7/00633* (2013.01); *B01F 7/245* (2013.01); *C22B 7/006* (2013.01); *B01F 2215/0431* (2013.01); *C22B 3/20* (2013.01); *C22B 3/44* (2013.01); *C22B 19/22* (2013.01)

(58) Field of Classification Search
USPC .......................................... 588/252, 256, 412
See application file for complete search history.

(56) References Cited

U.S. PATENT DOCUMENTS 2,080,779 A * 5/1937 Lessing ...................... 423/243.1
2,120,634 A * 6/1938 Stevenson ..................... 210/713
(Continued)

FOREIGN PATENT DOCUMENTS

CA      1079496 A1   6/1980
CN    101003854 A    7/2007
(Continued)

OTHER PUBLICATIONS

Seyer, S. et al., "JAROFIX: Addressing Iron Disposal in the Zinc Industry", JOM, pp. 32-35, Dec. 2001.
(Continued)

*Primary Examiner* — John Kreck
(74) *Attorney, Agent, or Firm* — Buchanan, Ingersoll & Rooney PC

(57) ABSTRACT

A method and apparatus for converting an iron-bearing residue generated in a hydrometallurgical process that contains small amounts of soluble heavy metals into a stable form by means of a neutralizing agent. The residue is elutriated and the elutriated residue is fed into at least one stabilization or homogenization reactor, into which a neutralizing agent is also routed, and the homogenous mixing together of the residue and neutralizing agent takes place by means of a helix mixer, where the ratio of the diameter of the mixer to the diameter of the reactor is 0.75-0.99.

20 Claims, 2 Drawing Sheets

Figure 1:
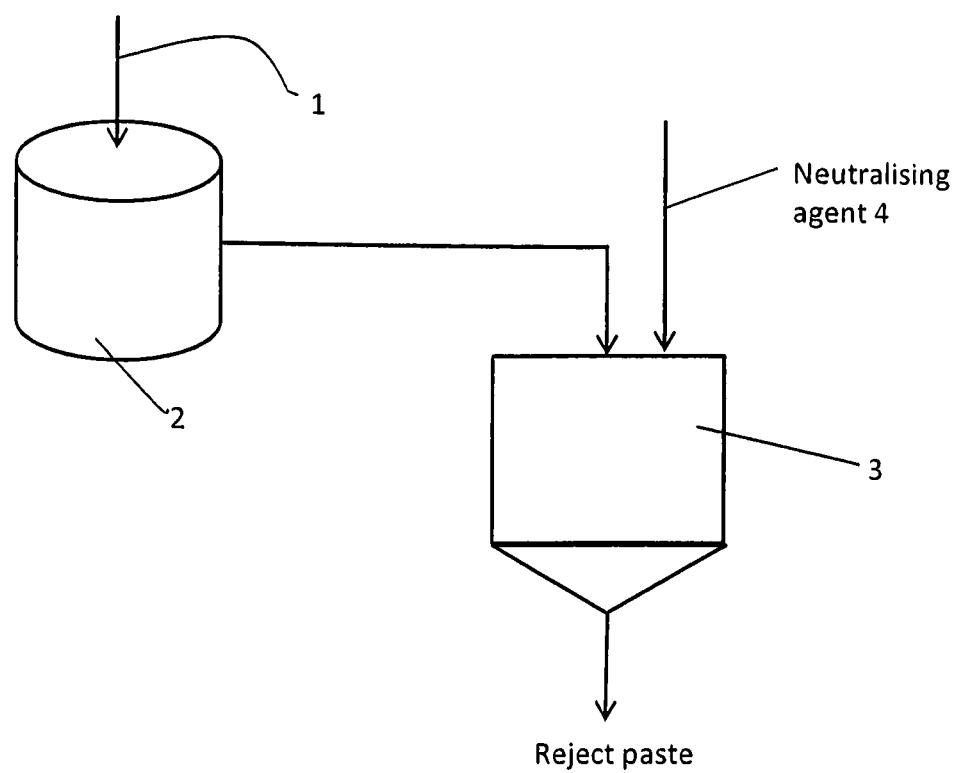

(51) Int. Cl.
*B01F 7/24* (2006.01)
*C22B 7/00* (2006.01)
*C22B 3/20* (2006.01)
*C22B 3/44* (2006.01)
*C22B 3/00* (2006.01)

(56) References Cited

U.S. PATENT DOCUMENTS

| | | | |
|---|---|---|---|
| 2,294,697 A * | 9/1942 | Seip | 210/661 |
| 3,105,041 A * | 9/1963 | Genter et al. | 210/608 |
| 3,875,046 A * | 4/1975 | Rosenbloom | 208/391 |
| 4,022,438 A | 5/1977 | Shishido et al. | |
| 4,424,126 A * | 1/1984 | Santhanam et al. | 210/195.1 |
| 5,182,087 A | 1/1993 | Lilja et al. | |
| 6,214,237 B1 * | 4/2001 | Kustra et al. | 210/709 |
| 2005/0014922 A1 | 1/2005 | Muller et al. | |

FOREIGN PATENT DOCUMENTS

| | | |
|---|---|---|
| CN | 101555551 A | 10/2009 |
| CN | 101596440 A | 12/2009 |
| DE | 41 10 907 A1 | 10/1991 |
| EP | 0 132 820 A2 | 2/1985 |
| EP | 0 301 261 A2 | 2/1989 |
| FI | 84787 B | 10/1991 |
| GB | 1 569 694 A | 6/1980 |
| IT | 1290886 | 12/1998 |
| JP | 03267136 | 11/1991 |
| WO | WO 03/056042 A1 | 7/2003 |
| WO | WO 2004/091797 A1 | 10/2004 |
| WO | WO 2006/024691 A1 | 3/2006 |

OTHER PUBLICATIONS

Ek, C. "Jarosite Treatment and Disposal by the 'Jarochaux' Process", Int. Symposium on Iron Control in Hydrometallurgy, pp. 719-728, Ch. 8, Part: VII (Oct. 19-22, 1986).
Finnish Search Report dated Apr. 8, 2011, issued in corresponding Finnish Patent Application No. 20100237. (2 pages).
Chinese Office Action (Notification of First Office Action) dated Mar. 31, 2014, issued by the State Intellectual Property Office of the People's Republic of China in corresponding Chinese Patent Application No. 201180027500.9, and English language translation of Office Action. (14 pages)
Extended European Search Report dated May 2, 2014, issued by the European Patent Office in corresponding European Patent Application No. 11789313.1-1706 / 2576039. (12 pages).
International Search Report (PCT/ISA/210) issued on Sep. 2, 2011, by the Finnish Patent Office as the International Searching Authority for International Application No. PCT/FI2011/050508.
International Preliminary Report on Patentability (PCT/IPEA/409) issued on Sep. 20, 2012, by the Finnish Patent Office as the International Searching Authority for International Application No. PCT/FI2011/050508.
Wills: "Wills' Mineral Processing Technology," Aug. 17, 2006, Elsevier Ltd., Cornwall, UK, XP040425914, vol. 7DOI.
Office Action issued in corresponding European Application No. 11789313.1 on Apr. 2, 2015 (3 pages).

* cited by examiner

METHOD AND APPARATUS FOR HOMOGENIZING AND STABILIZING AN IRON-BEARING RESIDUE

FIELD OF THE INVENTION

The invention relates to a method and apparatus for converting an iron-bearing residue containing small quantities of soluble heavy metals generated in a hydrometallurgical process into stable form by means of a neutralising agent. The residue is elutriated and the elutriated residue is fed into at least one stabilisation and homogenisation reactor, into which a neutralising agent is also routed. The homogenous mixing of the residue and neutralising agent takes place by means of a helix mixer, where the diameter of the mixer in relation to the diameter of the reactor is 0.75-0.99.

BACKGROUND OF THE INVENTION

The solid waste generated in hydrometallurgical processes, such as different kinds of iron deposits and leach residues, usually contain small amounts of soluble heavy metals, like zinc, cadmium, cobalt, nickel, arsenic and antimony. These kinds of residues require pre-treatment, in which they are stabilised before storage at a landfill site, so that the heavy metals do not dissolve from the waste. Known pre-treatment methods carried out either separately or together include for instance waste washing, neutralisation and precipitation of the metals as hydroxides, precipitation of the metals as sulphides, isolation of the waste site from the groundwater and binding the soluble compounds with for example, cement, phosphate or lime.

Sulphide precipitation is one effective method for binding heavy metals, but the additional costs incurred by the method as well as the large amount of water migrating to the landfill site may be considered a weakness. Due to the large quantity of water involved, multi-layered walls and a water collection system have to be constructed on the landfill site to prevent the water at the site from seeping into the groundwater.

The zinc production process is one typical process in which an iron-bearing waste is generated. The production process originating from zinc sulphide concentrate according to one approach comprises roasting of the concentrate, leaching of the calcine, i.e. zinc oxide that is obtained, where the zinc oxide is leached with a solution containing sulphuric acid to form a solution of zinc sulphate in what is called neutral leaching. The zinc sulphate solution is routed generally via solution purification to electrolytic recovery. The insoluble residue of neutral leaching consists of the zinc ferrite and sulphur formed in roasting, and the residue is treated in a strong acid leaching stage to leach the ferrite, so that the zinc bound to it is recovered. Iron is precipitated as jarosite, goethite or hematite, most commonly as jarosite. Often the residue is subjected to flotation to separate sulphur from the iron deposit. Zinc sulphide concentrate can also be routed for example to the strong acid leaching stage without roasting or the entire concentrate leaching can be performed without roasting and the waste residue that is generated contains both the iron and the sulphur of the concentrate.

The disposal of the iron residue generated in the leaching process of zinc concentrate and other equivalent metals should occur so that the final residue or reject is as poorly soluble as possible, whereby any small heavy metal residues that may be remained in it do not cause problems. Hematite is very poorly soluble, but its production generally requires autoclave conditions, which raise the costs of the process.

There have been attempts to solve the iron residue storage problem e.g. as presented in CA patent publication 1079496 and the publication by Ek, C. "Jarosite treatment and disposal by the 'Jarochaux' process," Int. Symposium on Iron Control in Hydrometallurgy, Oct. 19-22, 1986, Toronto, Part. VII pages 719-729, which describe the Jarochaux process. According to this method, an iron residue, which may be jarosite or other possible iron compounds, is mixed with a calcium compound. The calcium compound may be for example quicklime, slaked lime or lime milk. As a result of the physicochemical reactions spherical lumps are formed, with a diameter of 1-20 cm. The sulphate in the iron residue reacts with the calcium and forms gypsum, which in turn forms a skeleton inside the jarosite lump and a shell around the lump. The method consists of the following stages: the first stage is filtration, followed by elutriation to a solids content of about 50 g/l, after this thickening and filtration of the thickener underflow (solids content approx. 200 g/l), air drying of the residue on a filter, after which the moisture content is about 35%. From the filter the residue is routed by belt conveyor to a screw mixer, into which dust-like lime is also fed. When the iron residue is mainly jarosite, the amount of lime (CaO) to be added is 6-16% of the quantity of dry solids of the waste residue. When the waste residue is goethite, the amount of lime required is smaller. According to the examples in the patent publication, the mixing reactor for the residue and lime is launder-shaped and equipped with two blade mixers rotating opposite each other.

According to the method described in IT patent publication 1290886, waste containing heavy metals is stabilised by adding calcium hydroxide, orthophosphoric acid or its salts into the waste as an aqueous solution, and if necessary water, in order to obtain a paste of uniform consistency. The drawback of this method is that the waste has to be dried before storage at the landfill site.

Lime neutralisation is suitable for almost all kinds of wastes and even old landfill sites can be treated by the addition of lime. However, the method has the disadvantage that the waste generated is not of uniform quality. As a result of non-uniform neutralisation, some of the material remains un-neutralised and in some of the material the pH can rise so high that it causes the decomposition of the jarosite.

Yet another method intended for the disposal of iron residue, especially jarosite, is the Jarofix process, which is described for example in the article by Seyer, S. et al: "Jarofix: Addressing Iron Disposal in the Zinc Industry", JOM, December 2001, pages 32-35. The initial part of the method is similar to that of the Jarochaux process described above, i.e. the jarosite residue is elutriated, thickened and lime is mixed into the residue, but after this cement is further added to the residue to bind the residue. Cement enables the long-term physical and chemical stabilisation of iron residue. Of course the use of cement as a binding agent stabilises jarosite well, but it also causes extra costs for the process.

FI patent publication 84787 has disclosed an mixing reactor and a mixer located in it, and the apparatus is intended for mixing two liquids into each other or a liquid and solid and simultaneously separating from the liquid either the other liquid or the solid. The apparatus is made up of a three-part reactor, the upper section of which is cylindrical, the section below it conical and the lowest a tubular collection part. Baffles are positioned on the edges of the reactor. The mixer consists of two tubular coils surrounding the shaft and a protective cone fixed in the lower section of the mixer, which is intended to prevent the flows from entering the reaction zone and sucking drops of liquid upwards. The diameter of the mixer is 0.5-0.75× the diameter of the reactor, which means that in practice the agitated zone is only half the volume of the reactor. The mixer also extends into the conical section of the reactor and the distance of the tubular coils from the mixer shaft decreases correspondingly so that the ratio of the mixer diameter to the reactor diameter remains at the previous level. The reactor and mixer are intended for mixing either two liquids or a liquid and a solid and the description of the equipment reveals that the solids content of any slurry that may be generated is not very high. The mixing in the lower section of the mixer is weaker, so the phases separate after the reactions that have occurred during mixing. In the lower section of the reactor the aim is to prevent solids from migrating to the upper section of the reactor.

PURPOSE OF THE INVENTION

The purpose of the invention presented here is to eliminate the drawbacks of the methods described above and to disclose a method and apparatus, which will enable the formation from an iron residue of a reject paste of uniform quality with a very high solids content that is easy to store, by means of a neutralising agent. If there are no harmful compounds in the reject, it can be utilised as a soil enhancer for instance. After processing, the homogenous reject paste is transported directly to the storage site, where it hardens into a solid mass without any separation of solution from the mass into the site. According to the method, an additional benefit of the stabilised material is that the contact surface of rainwater and the stabilised reject paste is considerably smaller in comparison with pulverous or dust-like wastes.

SUMMARY OF THE INVENTION

The invention relates to a method for converting an iron-bearing residue generated in a hydrometallurgical process that contains small amounts of heavy metals into a stable form by means of a neutralising agent, where the residue is first elutriated. The elutriated residue is fed into at least one stabilisation or homogenisation reactor, into which a neutralising agent is also routed, and the homogenous mixing together of the residue and neutralising agent takes place by means of a helix mixer, where the ratio of the diameter of the mixer to the diameter of the reactor is 0.75-0.99.

According to one embodiment of the invention, the neutralising agent is fed into the stabilisation reactor in powder form.

According to another embodiment of the invention, the neutralising agent is fed into the stabilisation reactor in slurry form.

It is typical of the method accordant with the invention that the neutralising agent is a calcium and/or magnesium compound.

The invention also relates to an apparatus for converting an iron-bearing residue generated in a hydrometallurgical process that contains small amounts of heavy metals into a stable form by means of a neutralising agent, where the residue is first elutriated in an elutriation reactor. The elutriated residue is fed into at least one stabilisation or homogenisation reactor, the upper section of which is cylindrical and the lower section in the form of a downward-narrowing cone, and the residue and neutralising agent are fed into the upper section of the reactor, and the homogenous paste is removed from the lower section of the reactor; the reactor is equipped with a mixer, which contains at least two helical bars rotating around a shaft and supported on the shaft by means of support arms, and placed symmetrically in relation to each other and where the ratio of the diameter of the mixer to the diameter of the reactor is 0.75-0.99.

According to one embodiment of the invention, the mixer is made up of two parts, whereby the upper part, in which the distance of the helical bars from the shaft is the same along the entire height of the mixer section, is situated in the cylindrical part of the reactor and the lower section, in which the distance of the helical bars from the shaft decreases conically toward the lower section of the mixer, is located in the downward-narrowing conical part of the reactor.

According to one embodiment of the invention, the number of support arms supporting the helical bars at different heights is 4-8. It is typical of the mixer that the support arms are at an angle of 0-65° to the horizontal depending on the location of the support arms in the mixer or mixer section.

When the mixer accordant with the invention is made up of two parts, the helical bars of the upper and lower mixer section are preferably offset in relation to each other.

It is typical of the apparatus accordant with the invention that the helical bars of the reactor circle the shaft 0.5-2 times and that the angle of pitch of the helical bars is 15-45° with respect to the horizontal, preferably 25-35°.

According to one embodiment of the invention, the ratio of the diameter of the mixer to the diameter of the reactor is 0.85-0.95.

According to one configuration of the apparatus accordant with the invention, guide plates that are directed obliquely inwards from the edge of the reactor are placed in the upper section of the neutralisation reactor to guide the flows of slurry, and they extend inwards for a distance that is 3-8% of the diameter of the reactor.

LIST OF DRAWINGS

Figure 2:
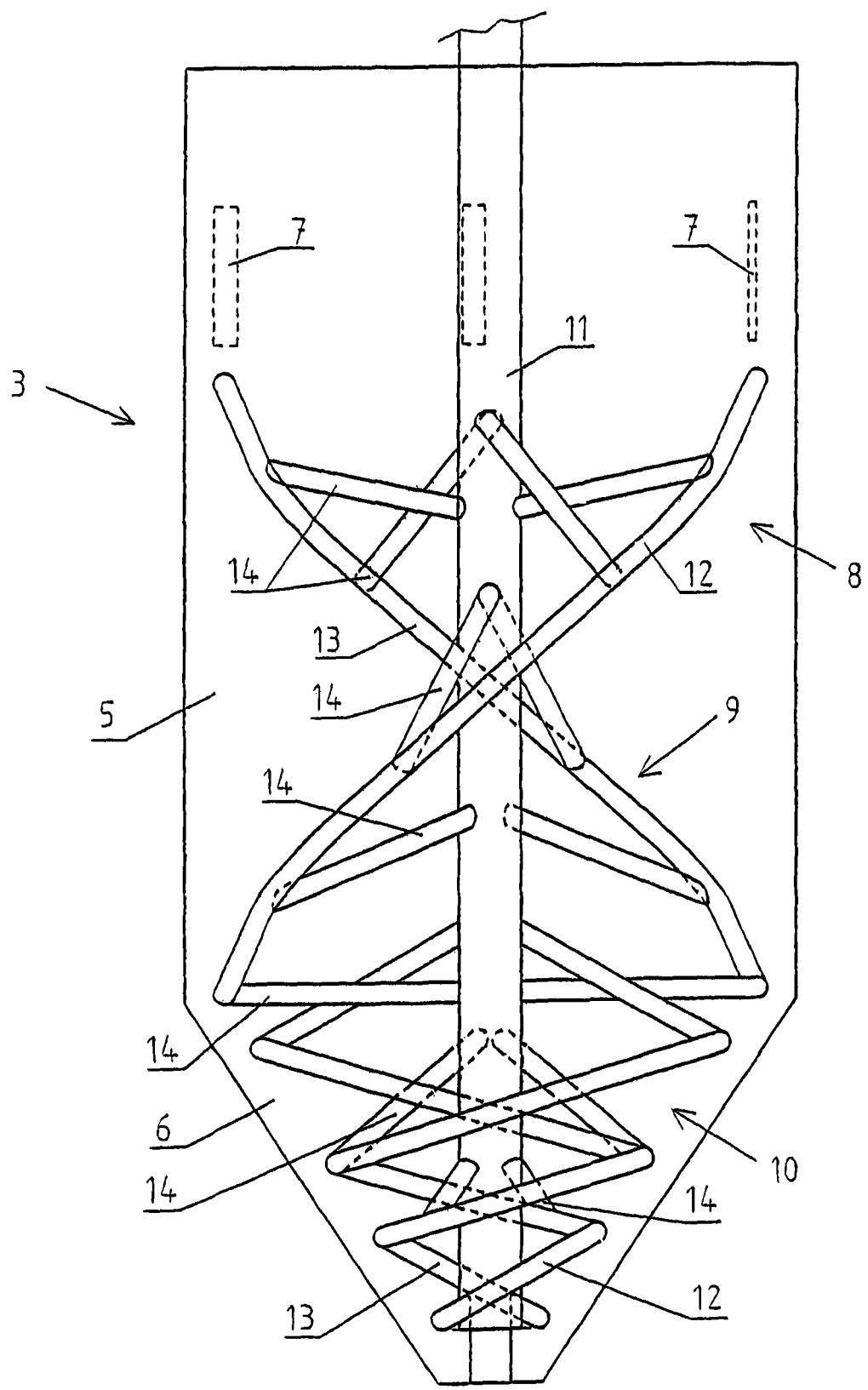

FIG. 1 presents a flow sheet of the process, and
FIG. 2 is a vertical section of an agitated reactor and mixer accordant with the invention.

DETAILED DESCRIPTION OF THE INVENTION

The invention relates to a method and apparatus for neutralising and stabilising a waste residue containing iron and small quantities of heavy metals. According to the invention, stabilisation occurs by a method in which the waste residue is stabilised into a homogenous reject paste so that the entire mass that is formed is of uniform size, and does not only form a skeleton and shell of lime. The waste residue may contain in addition to a jarositic iron residue for example a sulphur-bearing residue generated in the direct leaching of zinc. In addition to jarosite, the iron residue may also be made up of other iron compounds such as goethite or hydroxides. The iron-bearing waste residue may also originate from other processes than the production of zinc, although it has been found that it is especially suitable for this. Since the reject paste does not contain any harmful compounds, it can be utilised as a soil enhancer for example.

The term neutralisation reactor and stabilisation reactor used in the text mean the same reactor, and likewise neutralising agent and stabilising agent mean the same substance.

A simple process chart of the method is presented in FIG. 1. In the first stage of the method, a filter cake of waste residue 1 is elutriated in elutriation reactor 2 into a homogenous slurry. Depending on the moisture content of the residue, elutriation can be carried out in the water contained in the residue to be filtered or by feeding in additional water. The elutriated residue is fed for instance by means of a hose pump into stabilisation or homogenisation reactor 3, in which neutralisation takes place using a suitable neutralising or stabilising agent 4, such as a suitable calcium and/or magnesium compound. The stabilisation agent depends on the composition of the waste to be treated. The stabilisation agent can be fed in either dry or as an aqueous slurry and it is preferably fed inside the slurry. Besides a dry stabilising agent, water can also be fed into the reactor as required. There may be one or several stabilisation reactors in number. The stabilised and homogenous reject paste 6 is removed from the lower section of the reactor using a hose pump for example.

In the first stage of the method accordant with the invention, the residue exiting the filter is elutriated in elutriation reactor 2 into a homogenous slurry. No stabilising agent is added into this stage. In this way we can ensure that the waste to be stabilised is always of uniform quality before it is brought in to contact with the stabilising agent. For this reason the reactions between the waste and the stabilising chemicals in the stabilisation reactor take place in a controlled way. The method accordant with the invention allows the elimination of the drawbacks in the methods described above, such as variations in pH caused by uneven neutralisation. Too high a pH value can cause the decomposition of the material to be stabilised e.g. jarosite.

Controlled stabilisation reactions result in a homogenous reject paste, which can be transported directly to the landfill site, where it will harden into a solid mass without any separation of solution from the mass at the waste site. In the methods described above, poorly controlled reactions lead to the generation of non-uniform lumps, which may have a diameter of as much as 20 cm, but on the other hand also dusty pulverous material. According to the method, an additional advantage of stabilised, homogenous material is a considerably smaller contact surface between rainwater and the stabilised waste in comparison with pulverous or dust-like waste.

As FIG. 2 shows in more detail, the upper section 5 of stabilisation reactor 3 consists preferably of a vertical cylinder and the lower section 6 of a downward-narrowing cone. The angle of the cone is preferably 45-75°. The slurry to be neutralised is fed into the upper section of the reactor, into which guide plates 7 are advantageously placed to guide the flow towards the centre. The plates extend from the edge of the reactor obliquely inwards for a distance that is around 3-8% of the reactor diameter. The neutralised and stabilised reject paste is removed from the bottom of the conical lower section either by gravity or by force. The neutralisation reactor is equipped with mixer 8, which in the embodiment shown in FIG. 2 is two-part, consisting of upper mixing section 9 and lower mixing section 10. Both parts of the mixer are attached to the same vertical shaft 11. According to a second alternative, the mixer parts are integrated.

(Both) parts of the mixer are made of at least two helical bars 12 and 13 encircling and supported on a shaft. The helical bars are placed symmetrically in relation to each other so that the distance from the shaft is the same when looking at the same height. The angle of pitch of the helical bars is 15-45° to the horizontal, preferably 25-35°. The helical bars are supported on shaft 11 by means of support arms 14, which are located at 2-6 different heights in each mixer section depending on the height of the mixer section. In particular the number of support arms in the upper section is around 3-6. When the mixer is one-part, the support arms are located at 4-8 different heights. In each mixer section the support arms are at an angle of 0-65° to the horizontal depending on the location of the support arm in the mixer. The support arms act not only as support elements for the helical bars, but also as mixing members in the central section of the reactor and they promote the attainment of homogenous mixing.

In the upper mixer section the distance of the helical bars from the shaft is the same throughout the mixer section, but in the lower mixer section the distance of the helical bars from the shaft decreases conically towards the lower part of the mixer. Mixer 8 is placed in reactor 3 so that its lower conical mixer section 10 is located in conical section 6 of the reactor. When the mixer is integrated, the helical bars are continuous from bottom to top. When the mixer is made up of two mixer sections, the helical bars in the lower mixer section are preferably offset in relation to the helical bars of the upper mixer section. The ratio of the diameter of the mixer or mixer parts to that of the reactor is around 0.75-0.99, preferably 0.85-0.95, so that the whole of the material in the reactor is mixed evenly.

There are no baffles or protective cones in the stabilisation reactor, because the materials mixed together are either paste-like or the neutralising agent is a pulverous solid and the product to be generated is paste-like. Depending on the height of the reactor, the helical bars circle the shaft 0.5-2 times. The mixer is preferably coated with some suitable non-stick material such as Teflon.

The tests performed have shown that a mixer consisting of helical bars and their support arms allows the iron residue to be treated and the neutralising agent to be mixed very homogenously into a paste-like mass, in which individual particles of iron residue and neutralising agent cannot be distinguished. Likewise it has been found that the waste residue formed is very stable, so that the amount of heavy metals dissolving thereof is below the set guideline values.

EXAMPLES

Example 1

A filter cake of waste residue, which contained both jarosite and elemental sulphur, was elutriated in an elutriation reactor into a homogenous slurry. The moisture content of the waste residue was 39%. The slurry was pumped at 120 l/h from the elutriation reactor into the stabilisation reactor, into which 29 kg/h of dry calcium hydroxide was fed. 8 l/h of water was fed into the stabilisation reactor during the feed of calcium hydroxide. The effective volume of the stabilisation reactor was 30 dm$^3$. Stabilisation was carried out at room temperature. The continuous run was continued for five hours. During the run, 200 l of the stabilised waste that was formed was collected in barrels. Samples were collected of the stabilised waste during the run. The stabilised material was poured onto a flat base, in which the behaviour of the material was monitored. The material was allowed to harden overnight. The material had hardened and no water had come out of it. It was not possible to distinguish separate particles of iron residue and neutralising agent in a split and hardened piece. A solubility test in accordance with EU standard EN-12457-3 was made on the hardened, stabilised reject paste. The test results were below the hazardous waste limits set in the EU directive.

Example 2

In the example one of the test arrangements described was repeated with the difference that the stabilisation reactor accordant with the invention was replaced with a screw mixer. The result was a lumpy unhomogenous waste, in which unreacted lime was clearly detectable.

The invention claimed is:

1. A method for converting an iron-bearing residue generated in a hydrometallurgical process, containing small amounts of soluble heavy metals, into stable form by means of a neutralising agent, wherein the method comprises the following steps
    elutriating first the residue,
    feeding the elutriated residue into at least one stabilisation or homogenisation reactor,
    routing into the stabilisation or homogenisation reactor a neutralising agent, and
    mixing homogenously together the residue and the neutralising agent by means of a helix mixer, wherein the ratio of the diameter of the mixer to the diameter of the stabilization or homogenization reactor is 0.75-0.99.

2. A method according to claim 1, wherein the neutralising agent is fed into the stabilization or homogenization reactor in powder form.

3. A method according to claim 1, wherein the neutralising agent is fed into the stabilization or homogenization reactor in slurry form.

4. A method according to claim 1, wherein the neutralising agent is a calcium and/or magnesium compound.

5. An apparatus for converting an iron-bearing residue containing small amounts of soluble heavy metals that is generated in a hydrometallurgical process into a stable form by means of a neutralising agent, whereby the residue is first elutriated in an elutriation reactor, wherein the apparatus comprises an elutriation reactor, where an iron-bearing residue containing small amounts of soluble heavy metals is elutriated, the elutriated residue is routed to at least one stabilisation or homogenisation reactor, the upper section of which is cylindrical, and the lower section is shaped like a downward-narrowing cone, and where the residue and a neutralising agent are fed into the upper section of the stabilization or homogenization reactor and a homogenised paste is removed from the lower section of the stabilization or homogenization reactor; the stabilization or homogenization reactor is equipped with a mixer, which contains at least two helical bars that circle the shaft and are supported on the shaft by means of support arms, where said helical bars are located symmetrically in relation to each other and where the ratio of the mixer diameter to the diameter of the stabilization or homogenization reactor is 0.75-0.99 and there are no baffles or protective cones in the stabilization or homogenization reactor.

6. Apparatus according to claim 5, wherein the mixer is made up of two sections, whereby the upper mixer section, where the distance of the helical bars thereof from the shaft is the same throughout the height of the mixer section, is placed in the cylindrical part of the stabilization or homogenization reactor and the lower mixer section, where the distance of the helical bars thereof from the shaft gets smaller conically towards the bottom part of the mixer, is located in the section of the stabilization or homogenization reactor shaped like a downward-narrowing cone.

7. Apparatus according to claim 6, wherein the number of support arms supporting the helical bars at different heights is 4-8.

8. Apparatus according to claim 6, wherein the helical bars of the upper and lower mixer section are offset in relation to each other.

9. Apparatus according to claim 6, wherein the helical bars circle the shaft 0.5-2 times.

10. Apparatus according to claim 6, wherein the angle of pitch of the helical bars to the horizontal is 15-45°.

11. Apparatus according to claim 6, wherein the support arms in the mixer are at an angle of 0-65° to the horizontal depending on the location of the support arm in the mixer or mixer section.

12. Apparatus according to claim 6, wherein the ratio of the diameter of the mixer to the diameter of the stabilization or homogenization reactor is 0.85-0.95.

13. Apparatus according to claim 5, wherein the number of support arms supporting the helical bars at different heights is 4-8.

14. Apparatus according to claim 5, wherein the helical bars circle the shaft 0.5-2 times.

15. Apparatus according to claim 5, wherein the angle of pitch of the helical bars to the horizontal is 15-45°.

16. Apparatus according to claim 5, wherein the support arms in the mixer are at an angle of 0-65° to the horizontal depending on the location of the support arm in the mixer or mixer section.

17. Apparatus according to claim 5, wherein the ratio of the diameter of the mixer to the diameter of the stabilization or homogenization reactor is 0.85-0.95.

18. Apparatus according to claim 5, wherein the angle of pitch of the helical bars to the horizontal is 25-35°.

19. Apparatus according to claim 6, wherein the angle of pitch of the helical bars to the horizontal is 25-35°.

20. Apparatus according to claim 5, wherein guide plates are placed in the upper section of the stabilization or homogenization reactor, directed obliquely inwards from the edges of the stabilization or homogenization reactor to guide the slurry flow and extending inwards for a distance that is 3-8% of the stabilization or homogenization reactor diameter.

* * * * *